(12) United States Patent
Boisson et al.

(10) Patent No.: US 11,239,727 B2
(45) Date of Patent: Feb. 1, 2022

(54) ELECTRICAL MACHINE WITH A ROTOR HAVING A CAVITY FOR THE DYNAMIC BALANCING OF THE ROTOR

(71) Applicants: IFP Energies nouvelles, Rueil-Malmaison (FR); MAVEL S.r.l., Pont Saint Martin (IT)

(72) Inventors: Julien Boisson, Rueil Malmaison (FR); Benjamin Gaussens, Bievres (FR); Luca Favre, Valpelline (IT); Davide Bettoni, Settimo Vittone To Italy (IT); Wissam Dib, Suresnes (FR)

(73) Assignee: MAVEL EDT S.P.A., Pont Saint Martin (IT)

( * ) Notice: Subject to any disclaimer, the term of this patent is extended or adjusted under 35 U.S.C. 154(b) by 607 days.

(21) Appl. No.: 16/300,139

(22) PCT Filed: Apr. 10, 2017

(86) PCT No.: PCT/EP2017/058561
§ 371 (c)(1),
(2) Date: Nov. 9, 2018

(87) PCT Pub. No.: WO2017/194254
PCT Pub. Date: Nov. 16, 2017

(65) Prior Publication Data
US 2019/0149015 A1    May 16, 2019

(30) Foreign Application Priority Data
May 12, 2016  (FR) ................................. 16/54.216

(51) Int. Cl.
| H02K 7/04 | (2006.01) |
| H02K 15/16 | (2006.01) |
| H02K 1/27 | (2006.01) |
| H02K 1/24 | (2006.01) |

(52) U.S. Cl.
CPC .............. H02K 7/04 (2013.01); H02K 1/276 (2013.01); H02K 15/165 (2013.01); H02K 1/246 (2013.01); H02K 1/2766 (2013.01)

(58) Field of Classification Search
CPC ............................ H02K 7/04; H02K 15/165
See application file for complete search history.

(56) References Cited

U.S. PATENT DOCUMENTS
2015/0357879 A1  12/2015 Radwainski

FOREIGN PATENT DOCUMENTS
| FR | 1 341 204 A | 10/1963 |
| FR | 2 421 498 A1 | 10/1979 |

OTHER PUBLICATIONS

International Search Report for PCT/EP2017/058561, dated Jun. 9, 2017; English translation submitted herewith (5 pgs.).

*Primary Examiner* — Ramon M Barrera
(74) *Attorney, Agent, or Firm* — Fitch, Even, Tabin & Flannery LLP

(57) ABSTRACT

The present invention is an electrical machine comprising a stator and a rotor (10). The rotor is formed with a rotor body comprising a stack of laminations placed on a rotor shaft. The rotor includes at least one cavity with at least one arm for retaining at least one balancing weight.

17 Claims, 2 Drawing Sheets

ELECTRICAL MACHINE WITH A ROTOR HAVING A CAVITY FOR THE DYNAMIC BALANCING OF THE ROTOR

CROSS REFERENCE TO RELATED APPLICATIONS

Reference is made to PCT/EP2017/058561 filed Apr. 10, 2017, and French Application No. 16/54,216 filed May 12, 2016, which are incorporated herein by reference in their entirety.

BACKGROUND OF THE INVENTION

Field of the Invention

The present invention relates to an electrical machine and in particular to its rotor comprising a cavity for the dynamic balancing of the rotor of the electrical machine. It more particularly concerns a variable reluctance synchronous machine.

Description of the Prior Art

An electrical machine generally includes a fixed part (stator) and a rotary part (rotor) disposed coaxially one in the other.

The rotors of such machines suffer from imbalances caused by tolerances regarding manufacture, mechanical design, distribution of material, etc.

When the rotor turns at high speed, these imbalances generate vibrations that can lead to machine malfunctioning or even to deterioration of the rotor or the machine.

Moreover, these vibrations are the source of noise which can make using this machine uncomfortable.

It is therefore imperative to reduce greatly or to eliminate the imbalances of the rotor to prevent these vibrations.

To this end there is provision for dynamically balancing the rotor as a function of specifications established for each machine (noise level, frequency of vibrations, etc.).

It is known, notably from FR 1 341 204, to balance the rotor by removal of material. To be more precise, to counteract the imbalance of the rotor, the body of the rotor is machined by drilling or milling it.

Such balancing by removal of material has significant disadvantages.

In fact, depending on the amount of material removed, there is a risk of the mechanical characteristics of the rotor being greatly degraded.

Moreover, metal particles generated by machining may impede the operation of the machine. These particles are attracted by the magnetic parts of at least one of the rotor and the stator, creating disturbances in operation, and even jamming of the two parts relative to each other.

To balance a rotor it is also known to add material to the body of the rotor.

The material used for compensating the imbalance may be a paste that can be worked at the time of application to the rotor and which hardens after application and thus adheres mechanically to the rotor.

Balancing by adding balancing paste is difficult to implement, however, because, after its application to the rotor, the paste necessitates a drying time that depends on external parameters, such as air temperature, relative humidity, etc.

It is therefore necessary to place the rotor in storage for a time that varies considerably.

This involves complex logistics and increases the already costly production cost.

The material used may also be metal weights calibrated to achieve the balancing of the rotor, such as clips, screws, etc.

By way of example and as better described in patent application FR 2 421 498, these metal weights are perforated sheets that are fixed to axial pins on the rotor by clamping or gluing them.

In this balancing by adding material, it has nevertheless has been the case that very high angular accelerations or decelerations of the rotor and as a function of the ageing of the machine, the paste or the calibrated weights may become detached from the rotor and then lead to a loss of the balance of the rotor. This loss of balance therefore triggers vibrations harmful to the operation of the machine and to the comfort of the user.

Moreover, the paste or the calibrated weights that are detached can block the rotation of the rotor and cause a serious malfunction of the machine.

These disadvantages are even more important in the case of a variable reluctance electrical machine.

Such a machine includes a rotor carrying permanent magnets housed in the vicinity of flux barriers carried by said rotor.

This configuration then makes balancing by removal of material even more difficult given the small volume of the material constituting the rotor and the fact that its removal to achieve balancing must be carried out in a flux barrier, which by definition is an empty space.

Similarly, adding material risks disturbing the propagation of the magnetic flux of the magnets, notably if the addition is affected in one or more flux barriers.

SUMMARY OF THE INVENTION

The present invention remedies the disadvantages listed above by balancing the rotor by addition of material without such addition being liable to disturb the correct operation of the electrical machine.

To this end, the present invention concerns an electrical machine comprising a stator and a rotor. The rotor is formed having a rotor body with stacked laminations placed on a rotor shaft, characterized in that the rotor includes at least one cavity with at least one arm for retaining at least one weight for dynamically balancing the rotor.

The arms can extend from one side of the cavity toward the center of the cavity.

The arms can be offset circumferentially from one another by an angle of 120°.

The arms can have an end located at a distance from the center of the cavity.

The ends of the arms can include a concave curved surface.

The balancing weight may have a cross section that is inscribed between the ends of the arms.

The cavity may have a closed section which is preferably a polygonal closed section such as a pentagonal closed section.

The cavity can be formed by punching the laminations.

The cavity can be disposed along and substantially parallel to the longitudinal axis of the rotor.

The cavity can be situated in the vicinity of the bore receiving the shaft of the rotor.

BRIEF DESCRIPTION OF THE DRAWINGS

The other features and advantages of the invention will now become apparent on reading the following description given by way of nonlimiting illustration only and to which are appended.

DETAILED DESCRIPTION OF THE INVENTION

Figure 1:
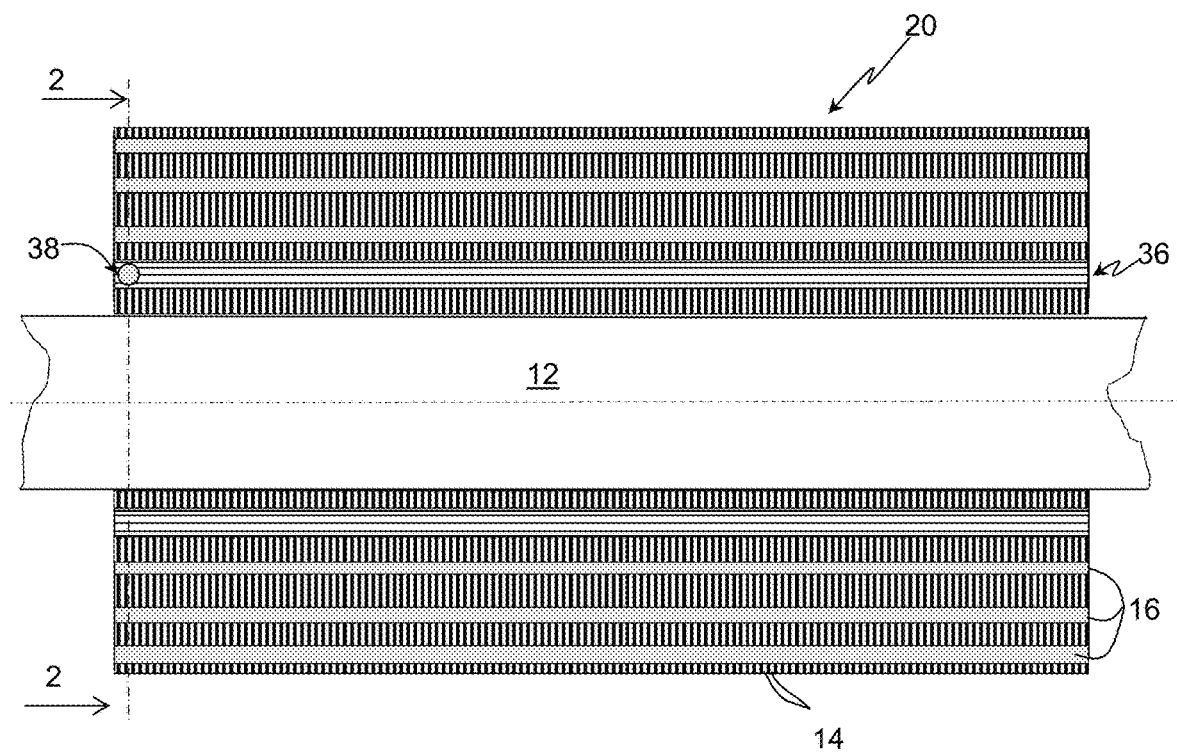
FIG. 1 is a diagrammatic view in axial section of the rotor of the invention taken along the line 1-1 in FIG. 2.
Figure 2:
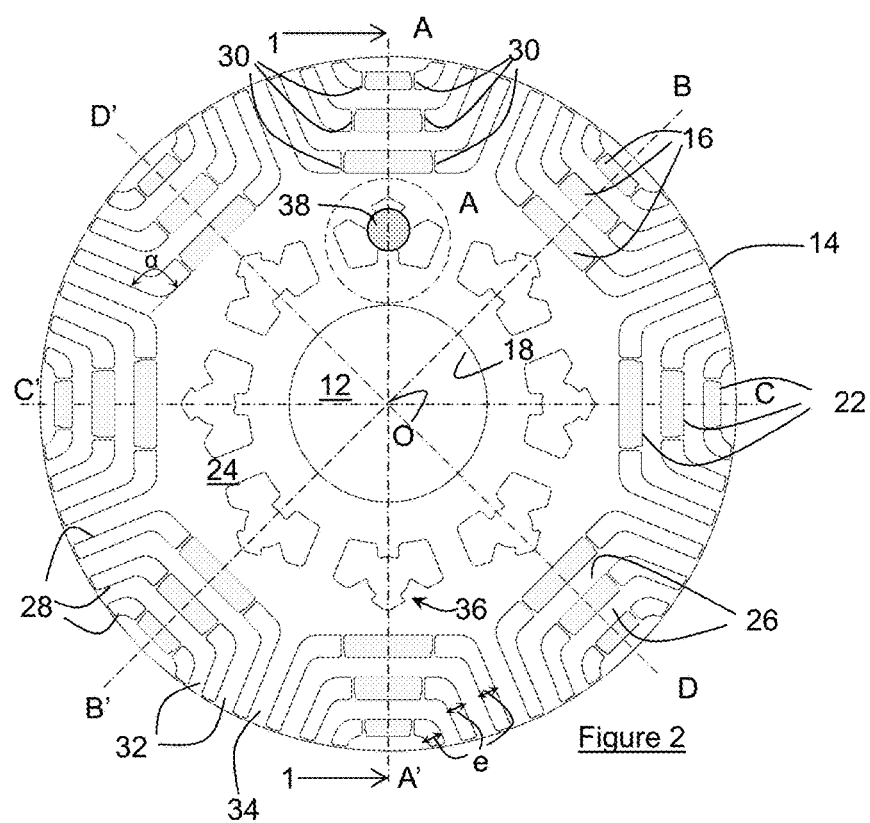
FIG. 2 is a diagrammatic view in radial section of the rotor taken along the line 2-2 in FIG. 1.

According to the embodiment shown in FIGS. 1 and 2, a rotary electrical machine includes a stator (not shown) and a rotor 10.

As shown in FIG. 1, the rotor includes, in a known manner, a shaft 12 on which is placed a stack of identical plane laminations 14 that are preferably ferromagnetic and carry a plurality of magnetic flux generators 16.

Referring also to FIG. 2, the circular laminations 14 comprise a central bore 18 through which the rotor shaft 12 passes and a plurality of axial openings that pass completely through the laminations.

As is known, the laminations are assembled to one another by causing the bores and the openings to correspond and by any known means, such as gluing, pressing, etc.

Assembled in this way, the laminations form the body of the rotor 10 that carries the shaft 12.

This configuration is more particularly applied to a variable reluctance electrical machine as described further hereinafter.

In this configuration, the body includes a first series of axial openings that house magnetic flux generators 16 and another series of axial openings that create magnetic flux barriers.

Here the first series of axial openings 22 are quadrilateral, which here are rectangular in shape. The openings 22 receive the magnetic flux generators 16, which here are permanent magnets in the form of also rectangular rods having a length substantially equal to the length of the body. These openings 22 are termed "housings" in the remainder of the description.

The housings 22, which are here three in number, are disposed radially on top on one another and at a distance from one another from the center O of the bore 18.

The series of three housings is repeated circumferentially around the center point O with four axes AA', BB', CC' and DD' offset by an angle of 45° to form a succession of series that are regularly distributed about the center point O.

Accordingly, as shown in FIG. 2, on each half-axis (OA, OA'; OB, OB'; OC, OC'; OD, OD') there are three axial housings 22. The longest faces thereof are perpendicular to the half-axes and the dimensions of these faces decrease from the center O toward the periphery of the lamination.

The housing 22 nearest the bore 18 have a bridge 24 of material with the bore. Bridges 26 of material are located between the housings.

The housing 22 farthest from the bore 18 is located at a distance from the peripheral edge of the body.

The other series of openings has perforations 28 of substantially constant thickness "e" which is inclined in a radial direction extending from the housings to the vicinity of the edges of the laminations.

These perforations start from the lateral edge 30 of the housings 22 and extending at an angle a from a plane passing through one of the longest faces of the housings to arrive in this vicinity.

As shown in FIG. 2, the inclined perforations are disposed symmetrically relative to the housings. To be more precise, there is a series of three inclined perforations on one side of the half-axis and another series of three inclined perforations on the other side of that same half-axis.

There is therefore formed each time a substantially V-shaped geometrical figure with a flattened bottom where the flat bottom is formed by the housing 22 and the inclined arms of that V-shape are formed by the perforations 28. There are then obtained on each half-axis three superposed V-shapes at a distance from one another and with dimensions of height and width that decrease from the bore toward the periphery of the body.

Accordingly, apart from the material bridges 24, 26, there is a solid part 32 between the inclined perforations of each V-shape and another solid part 34 between the perforation nearest the bore of a series of three V-shapes and the perforation nearest the bore of another adjacent series of V-shapes.

As a result, flux barriers formed by the perforations are created. The magnetic flux from the magnets can then pass only through the material bridges and the solid parts.

This body further comprises at least one cavity 36 in the material bridge 24 receiving at least one balancing weight 38 in the vicinity of the bore 18 receiving the shaft 12.

In the example from the figures, at least one cavity is provided on each half-axis, which makes it possible to obtain eight cavities that are equi-angularly spaced.

Each cavity 36 advantageously extend substantially parallel to the shaft 12 from one lateral face of the body to the other face.

Each cavity 36 can be the result of punching 40 each lamination and assembling the laminations with one another, thereby forming this cavity.

In the figures, the cavity 36 has a polygonal, here pentagonal, closed section. However any other section may be envisaged, such as a circular section.

Figure 3:
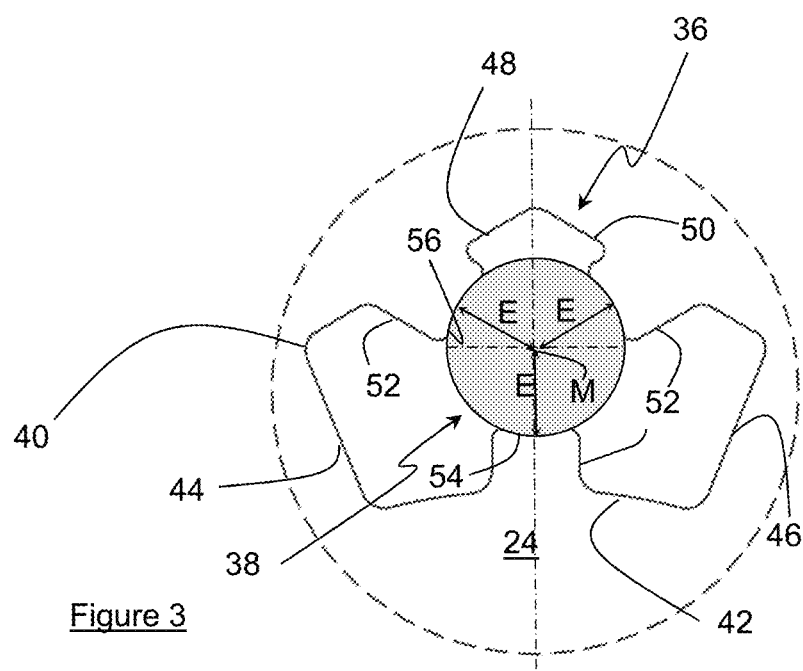
FIG. 3 is a view having a larger scale of detail than line A in FIG. 2.

As can be seen better in FIG. 3, this pentagonal shape, which is an irregular shape here, comprises a base 42 that intersects a half-axis orthogonally and preferably has a curvature corresponding to that of the bore. Two inclined sides 44 and 46 of the base 42 continue in the direction of the peripheral edge of the lamination with an inclination that diverges from the half-axis and terminates in two inclined faces 48, 50 that define a roof shape and close the pentagonal shape.

The cavity comprises at least one arm 52, which here are three arms of identical shape, for retaining at least one balancing weight 38 that is immobilized in this cavity by these arms.

The arms are disposed at 120° to one another and extend in a direction toward the interior of the cavity and preferably toward its center M.

As shown in FIG. 3, one of the arms starts at the level of the median zone of the base 42 of the cavity, is orthogonal to that face, and extends vertically in the direction of the junction of the two inclined faces 48 and 50 so that the free end 54 of this arm is at a distance E from the center M of the cavity.

Each of the two inclined faces 48 and 50 also carries an arm 52 that extends towards the center M to a distance E from said centre.

The general directions of these three arms therefore join at the center M of the cavity.

The balancing weight 38 can have any section that is a force fit between the free ends of the free arms.

By way of example, the balancing weight can be a ball or a rod of circular section with a radius slightly greater than the distance E so that the ball or the rod has a cross section that is located between the ends of the arms, and is retained between the ends 54 by friction.

In this configuration with a ball or a rod of circular section at the ends 54 of the arms 52 has a concave curved surface 56 with a radius that corresponds to the distance E.

In another example, the balancing weight can have a different section but is contained within the space between the ends of the three arms, such as a rod of triangular or hexagonal section that is forced between the ends of these three arms.

To balance the rotor 10 it is first necessary to define and to locate the imbalances to be balanced.

This operation can be carried out on appropriate machines that are well known to persons skilled in the art. This makes it possible to determine, generally by calculation and in accordance with imbalance correction laws, the quantity and the positioning of the balancing weights to be added to the rotor to balance it.

The method according to the invention therefore adds one or more balancing weights, here in the form of balls, in one or more cavities 36.

Thus, balancing of the rotor can be achieved without disturbing the transmission of the magnetic flux in at least one of the bridges and the solid parts.

Moreover, the arms have some radial and axial elasticity that allows absorption of the manufacturing tolerances of the ball while ensuring retention of that ball in the cavity.

Moreover, the cavities make it possible to reduce the weight of the rotor, which can only improve the dynamic performance of the rotor.

The invention claimed is:

1. An electrical machine comprising a stator and a rotor, the rotor being formed with a stack of laminations into a rotor body placed on a rotor shaft, wherein the rotor includes at least one cavity including at least one arm for retaining at least one weight for dynamically balancing the rotor, and wherein the at least one arm has an end spaced at a distance from a center of the cavity and the arms each include a concave curved surface.

2. The electrical machine according to claim 1, wherein the at least one arm extends from an edge of the cavity toward a center of the cavity.

3. The electrical machine according to claim 1, wherein the arms are spaced circumferentially from each other by an angle of 120°.

4. The electrical machine according to claim 2, wherein the arms are spaced circumferentially from each other by an angle of 120°.

5. The electrical machine according to claim 1, wherein the at least one balancing weight has a cross section that is located between the ends of the arms.

6. The electrical machine according to claim 2, wherein the at least one balancing weight has a cross section that is located between the ends of the arms.

7. The electrical machine according to claim 3, wherein the at least one balancing weight has a cross section that is located between the ends of the arms.

8. The electrical machine according to claim 1, wherein the cavity has a closed section.

9. The electrical machine according to claim 2, wherein the cavity has a closed section.

10. The electrical machine according to claim 3, wherein the cavity has a closed section.

11. The electrical machine according to claim 5, wherein the cavity has a closed section.

12. The electrical machine according to claim 8, wherein the cavity has a polygonal closed section.

13. The electrical machine according to claim 8, wherein the cavity has a pentagonal closed section.

14. The electrical machine according to claim 12, wherein the cavity has a pentagonal closed section.

15. The electrical machine according to claim 1, wherein the cavity comprises punched laminations.

16. The electrical machine according to claim 1, wherein the cavity is disposed along and is parallel to a longitudinal axis of the rotor.

17. The electrical machine according to claim 1, wherein the cavity is adjacent to a bore receiving the rotor shaft.

* * * * *